June 27, 1967  D. H. BAUGHAN  3,327,921
DISH-LIKE CONTAINER AND BLANKS THEREFOR
Filed Oct. 6, 1965  3 Sheets-Sheet 1
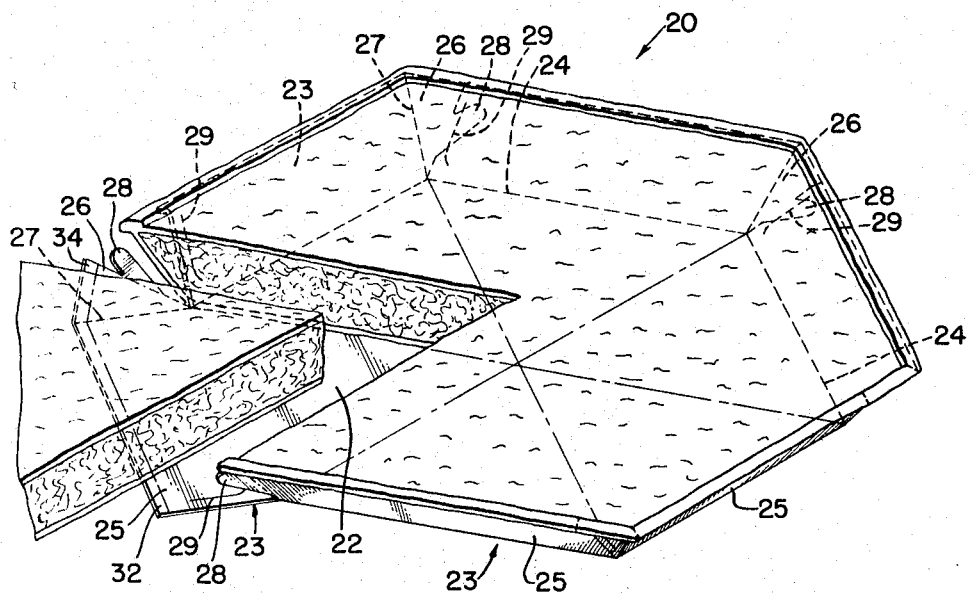
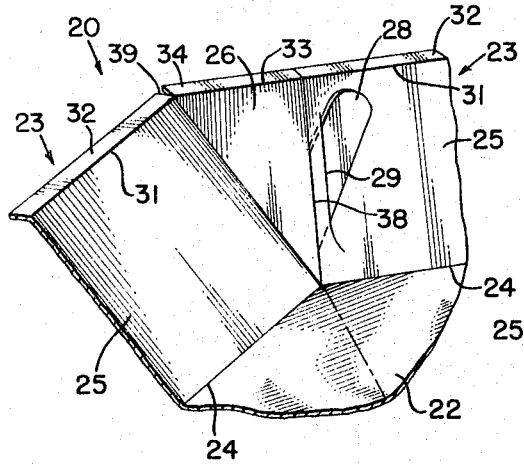
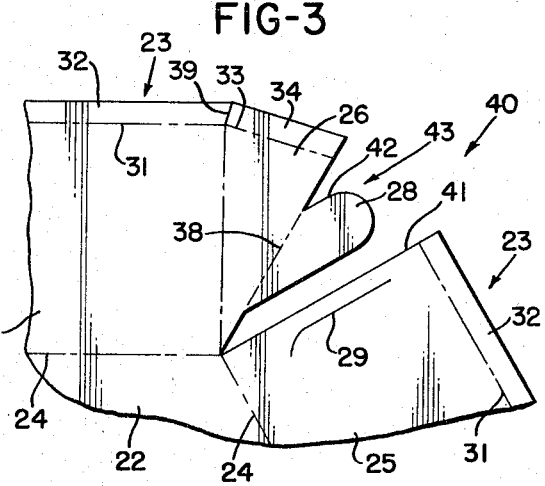
INVENTOR.
DRURY H. BAUGHAN
BY
HIS ATTORNEYS

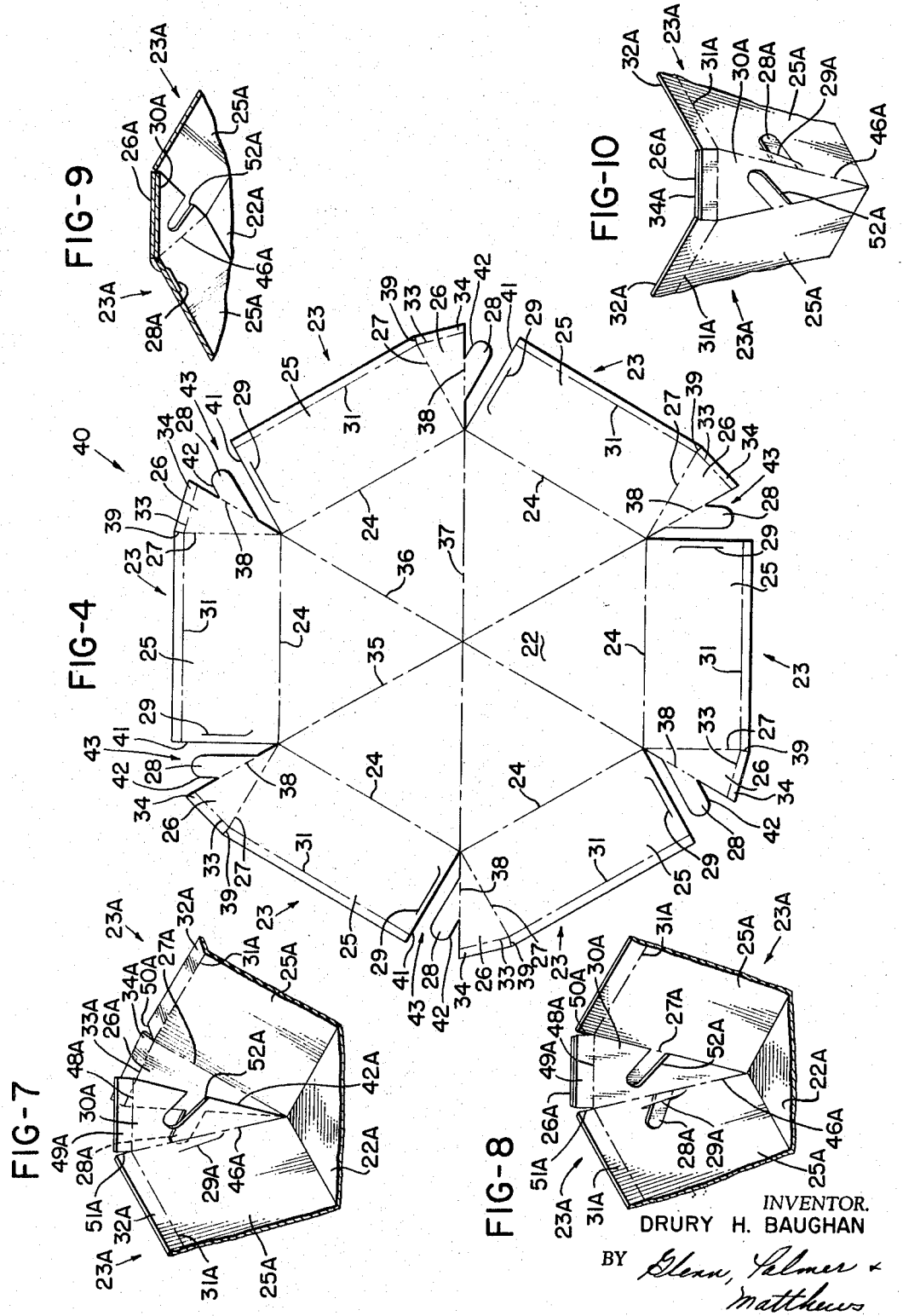

June 27, 1967 D. H. BAUGHAN 3,327,921
DISH-LIKE CONTAINER AND BLANKS THEREFOR
Filed Oct. 6, 1965 3 Sheets-Sheet 3
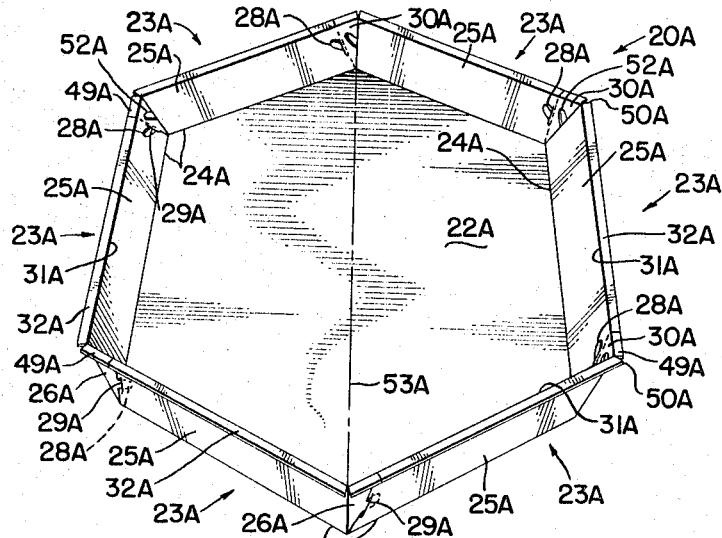
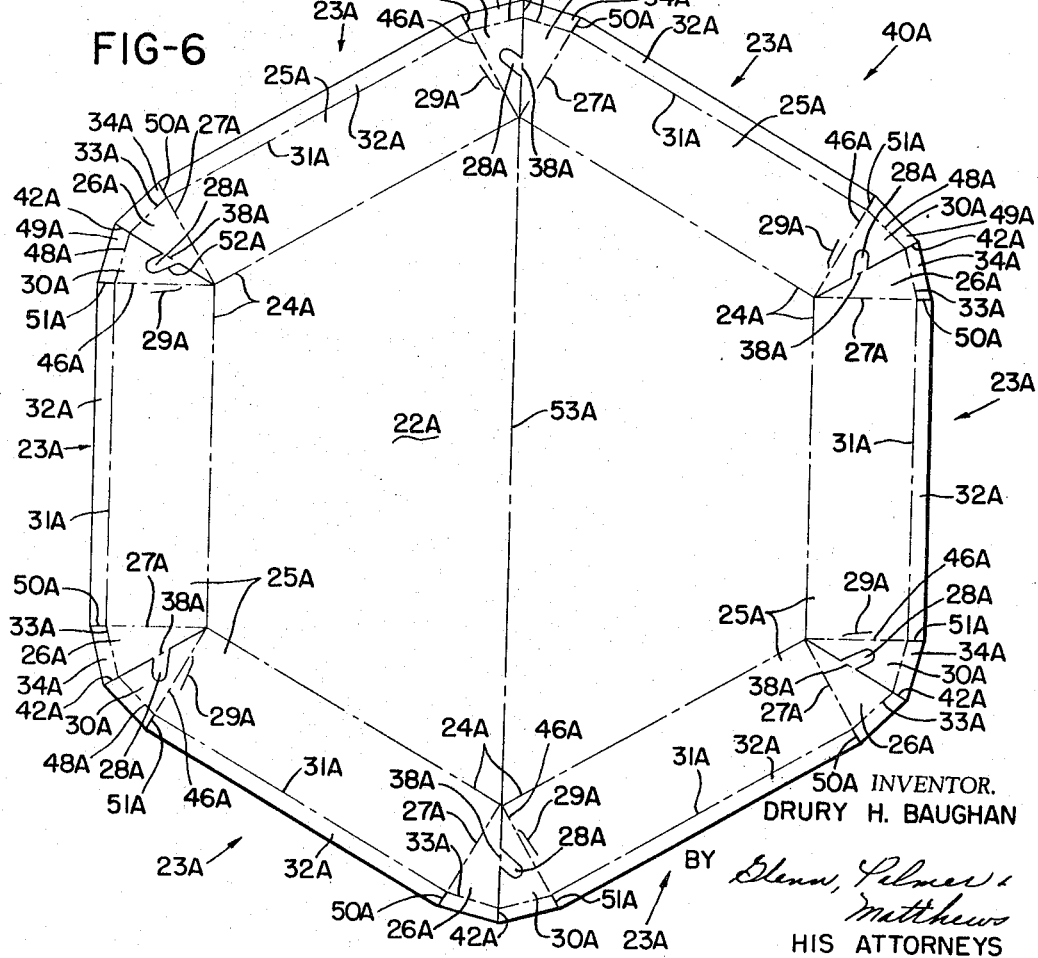
INVENTOR.
DRURY H. BAUGHAN
BY
HIS ATTORNEYS United States Patent Office 3,327,921
Patented June 27, 1967

3,327,921
DISH-LIKE CONTAINER AND BLANKS
THEREFOR
Drury H. Baughan, Richmond, Va., assignor to Reynolds Metals Company, Richmond, Va., a corporation of Delaware
Filed Oct. 6, 1965, Ser. No. 493,405
16 Claims. (Cl. 229—31)

ABSTRACT OF THE DISCLOSURE

This disclosure relates to a dish-like container or pan, and to blanks for making same, of the type used as a baking pan for pastry products such as pies, for example, and such pan has side wall means which are easily assembled and disassembled without requiring separate fastening means and which may be folded coplanar with the bottom wall thereof for easy removal of the contents of such pan.

---

This invention pertains to containers and more particularly to improved dish-like containers and to improved blanks for making such containers or the like.

A dish-like container is not currently available having the combined features of being economically produced, adapted for folding into a compact package for flat shipment, simply assembled without requiring separate fastening means, and adapted for partial disassembly for access to the contents thereof yet readily reassembled. By way of example, in the field of prepackaged food mixes such as "kit" type pie mixes, there is not now marketed a "kit" type pie mix complete with mix for crust, filling, and a pie pan. This is in large part due to the current practice of using pans which are generally stamped into a conventional shape, which of course fixes their sizes and precludes their being collapsed and packaged in a kit. Furthermore, the excessive space required for such pies has also generally discouraged the introduction of a packaged food mix complete with baking and/or serving dish.

Accordingly, it is a feature of this invention to provide an improved dish-like container of simple construction which is inexpensively produced using standard machinery and which may be collapsed and folded flat for shipment while being capable of easy assembly.

Another feature of this invention is to provide an improved dish-like container which may be easily assembled without use of separate fastening means.

Another feature of this invention is to provide a dish-like container in which side wall means thereof may be easily and quickly disassembled for ready access to the contents of such container without disturbing the remainder of the container, such side wall means being adapted for simple reassembly.

Another feature of this invention is to provide a dish-like container having outwardly flaring side wall means in which the angle of outward flaring is determined by a triangular portion which provides structural support for the contents of the container.

Another feature of this invention is to provide a dish-like container having a bottom wall and a plurality of side wall means extending therefrom as an integral part thereof and being fastened together into a continuous side wall without requiring additional structural elements.

Another feature of this invention is to provide a dish-like container as stated in the next preceding paragraph in which each of the side wall means includes a lip extending from the top edge thereof.

Another feature of this invention is to provide a dish-like container having score lines therein for use as reference lines and including score means for folding such container thereabout into a compact unit.

Therefore, it is an object of this invention to provide an improved dish-like container having one or more of the novel features of this invention as set forth above or hereinafter shown or described.

Another object of this invention is to provide improved container blanks for such a container or the like.

Other objects, uses, and advantages of this invention are apparent from a reading of this description, which proceeds with reference to the accompanying drawings forming a part thereof and wherein:

FIGURE 1 is a perspective view of a container of this invention used as a pie pan, particularly showing a pie therein with its first piece cut and partially removed through a side wall thereof which has been folded down.

FIGURE 2 is an enlarged view of a corner portion of the pan of FIGURE 1 showing tab and slit means used in fastening adjoining side walls together.

FIGURE 3 is an enlarged view showing the corner portion of FIGURE 2 with the adjoining walls folded coextensive with the bottom wall and illustrating the position of the fastening tab and its cooperating slit.

FIGURE 4 is a plan view of the blank used in making the pan of FIGURE 1.

FIGURE 5 is a perspective view illustrating another exemplary embodiment of a dish-like container of this invention.

FIGURE 6 is a plan view of the blank used in making the container of FIGURE 5.

FIGURE 7 is an enlarged perspective view of a corner fragment of the container of FIGURE 5 showing the arrangement of two adjoining walls in which the triangular portion having a projecting tab is located on the outside of the container.

FIGURE 8 is an enlarged perspective view of the corner fragment illustrated in FIGURE 7 fully assembled.

FIGURE 9 is a section through the fastened side walls of FIGURE 8.

FIGURE 10 is an enlarged perspective view of a corner fragment of the container of FIGURE 5 in which the triangular portion having a projecting tab is positioned on the inside of the container.

While the various features of this invention are hereinafter illustrated and described as being particularly adaptable to a dish-like food container for packaging as well as providing a baking pan for pastry products such as cakes and pies, for example, it is to be understood that the various features of this invention can be utilized singly or in any combination thereof to provide dish-like containers for other articles as desired.

Therefore, this invention is not to be limited to only the embodiments illustrated in the drawings because the drawings are merely utilized to illustrate one of the wide variety of uses of this invention.

In the exemplary embodiment of the invention illustrated in FIGURES 1–4 an improved dish-like container 20 of this invention is illustrated, as well as the improved container blank, in FIGURE 4, for making such container.

In the example illustrated in FIGURE 1, container 20 is shown being used as a pie baking and serving pan. The container or baking pan 20 is very economically constructed and particularly adapted to be folded flat into a small compact size enabling it to be packaged with the complete pie mix including mix for the crust, filling, etc. Pan 20 has integral fastening means for its side wall means which permit it to be easily and efficiently assembled by a user without difficulty and without requiring additional separate fastening means. A peripheral projection or lip extends from the top edge of the side wall means for pan 20 enabling the pie crust to be supported thereon. After the pie has been baked and is ready to be served, means is provided for readily and simply folding a portion of the pan side wall into a plane coextensive with its bottom wall to thereby permit easy removal of the first slice of pie, or for that matter easy removal of the remainder of the pie by cutting and successively disassembling the side wall means as additional pie is cut. If only a portion of the pie is removed, the pan side wall means may be readily reassembled and used as a storage container.

Container 20 has a bottom wall 22 shown in this example in the polygonal shape of a hexagon and continuous side wall means illustrated as six side wall means each designated by the numeral 23.

The side wall means or side walls 23 are generally identical and each is foldable about an associated fold line 24 in bottom wall 22. Each side wall 23 extends upwardly from the bottom wall 22 to define an angle with such bottom wall of not less than 90° and preferably flaring outwardly at a fairly large obtuse angle. The number of side wall means 23 corresponds to the number of sides in the polygonal bottom wall 22, in this illustration six side wall means 23 are shown corresponding to the hexagonal bottom wall. Because each side wall means or side wall 23 is identical to the others the same numerals will be applied to corresponding portions.

While it is preferable that pan 20 be made from a single sheet of foldable material as shown and described in more detail in connection with the blank therefor, it will be appreciated that separate extensions could be attached to bottom wall 22 and each folded upwardly, i.e. foldably connected, to define the side wall means.

Each side wall 23 has a generally rectangular portion 25 at one end and a generally triangular portion 26 at its opposite end. The triangular portion 26 is arranged with one of its three points oriented adjoining the bottom wall 22 and one of its sides coextensive with an end of rectangular portion 25 along a score line shown at 27. It will be seen that both the rectangular portion 25 and triangular portion 26 of each side wall 23 are self sufficient structural units of each side wall. The size of the triangular portion 26 also controls the amount of outward flare of each side wall 23.

Means is provided for fastening and unfastening the side wall means of pan 20. In this example such means is provided as an integral portion of each side wall means 23 and includes cooperating tab means 28 and slit means 29.

Tab means or tab 28 extends from one of the portions of the side wall means 23 and in this example tab 28 extends from the triangular portion 26. Tab 28 extends from a point located generally midway along the height of each of the side wall means 23.

Slit means or slit 29 is provided in the opposite end portion of side wall means 23. Slit 29 is provided in rectangular portion 25 at a point remote from the triangular portion 26, that is, at the end of rectangular portion 25 opposite the triangular portion 26. Slit 29 is positioned at a location along the height of side wall 23 corresponding to the position of tab means 28.

Each side wall means 23 has a peripheral projection or lip in each of its two portions and at the upper end thereof. Rectangular portion 25 has a fold line 31 which defines a lip portion 32. Triangular portion 26 has a fold line 33 which defines a lip portion 34. The lip portions 32 and 34 for each side wall 23 are folded generally horizontally about their respective fold lines to provide a continuous outwardly projecting lip which supports the pie crust.

The fastening action provided by tab 28 cooperating with slit 29 is shown particularly in FIGURES 2 and 3. Upon assembling container 20 each tab 28 cooperates with slit 29 in an adjoining side wall 23, thereby individually fastening each side wall means 23 to an adjoining side wall means. This is done by either inserting tab 28 so that it projects to the outside of pan 20, or tab 28 can be inserted so that it projects to the inside of container 20, as illustrated. In either manner the associated side wall means 23 will be properly held. Note also that with this arrangement it is not necessary to have additional external fastening means because full and ample support is provided by the interlocking of the tab 28 with an associated cooperating slit 29.

As shown particularly in FIGURE 4 of the blank used for forming pan 20, score lines 35, 36, and 37 section the bottom wall 22 into six equal wedge-shaped sections. Ordinarily, each pie is cut into six equal pieces. However, it will be appreciated that the number of sides in the polygon forming bottom wall 22 can be selected to provide any number of wedge-shaped sections. The score lines 35, 36, and 37 may be used as guide lines to assure that each piece of pie is equal to an adjoining one during the cutting thereof.

Container or baking pan 20 can be formed in any suitable manner and made from any suitable foldable material. It is preferably formed from the container blank 40, illustrated in FIGURE 4. Blank 40 is made of cardboard or the like having one or both sides thereof laminated with metallic foil, such as aluminum-containing metallic foil, or the like, suitably colored, embossed, imprinted, or remaining plain, as desired.

Blank 40 is of roughly circular outline in this example, and is suitably cut and scored to define a hexagonal bottom wall 22 and a plurality of side wall means 23 extending peripherally about bottom wall 22.

Bottom wall 22 has a plurality of score or fold lines 24 therein each coinciding with a corresponding edge of wall 22. Each side wall 23 extends beyond a fold line 24 and upon assembling pan 20 from blank 40, each side wall 23 is foldable about its associated fold line 24 and extends upwardly from the bottom wall 22 to define an angle between each side wall means 23 and the bottom wall 22 of not less than 90°.

Each side wall 23 has a generally rectangular portion 25 at one end and a generally triangular portion 26 at its opposite end with their sides coinciding on a common score line 27. The rectangular portion 25 has a fold line 31 therein which defines a lip portion 32. The triangular portion 26 has a fold line 33 which defines a lip portion 34. The lip portions 32 and 34 are separated by a cut 39 therebetween and generally coextensive with score line 27 enabling each lip portion to be folded about its score line in the assembled pan 20 to provide a continuous surface which supports the crust of the pie carried in pan 20.

Cut means is provided in blank 40 adjacent each side wall 23 defining tab 28 extending from one end of each side wall 23. The cut means defining each tab 28 comprises an elongated cut 41 and a contour cut 42 which intersect at each corner of hexagonal wall 22 and together outline a cutout shown at 43. Tab 28 projects from the triangular portion 26 and is located generally midway along such triangular portion.

Slit means shown as elongated slit 29 is provided in the opposite end portion of side wall means 23. Slit 29 is provided in rectangular portion 25 at a position along such rectangular portion corresponding to the position of tab 28.

It will be seen that upon assembling pan 20 from blank 40, tab 28 of a given side wall 23 cooperates with slit 29 of an adjoining side wall to individually fasten each side wall 23 to another to form a continuous side wall for pan 20.

Blank 40 has score lines 35, 36 and 37 therein which extend from opposite points of hexagonal bottom wall 22 through the center thereof to thereby divide bottom wall 22 into six equal segments. Each score line 35, 36 and 37 in this example is extended beyond bottom wall 22 at both ends to thereby provide a score line shown at 38 in each tab 28. The scoring thus provided enables blank 40 to be folded about any score line 35, 36, or 37 and the score line sections 38 at each end thereof to thereby decrease the total transverse dimension of blank 40 and make it readily and easily packaged into a small compact container with a mix for the pie crust, and for the pie filling.

In the exemplary embodiment of this invention illustrated in FIGURES 5–10, a dish-like container and the blank from which it is made (FIGURE 6) is shown which is basically similar to the dish-like container of FIGURES 1–4. Similar parts in both embodiments will be designated by the same numeral being followed in this latter embodiment by the reference letter "A."

As shown in FIGURE 5, container 20A has a bottom wall 22A which is hexagonal in shape and six side wall means or side walls each designated by the numeral 23A. The side walls 23A are generally identical and each is foldable about an associated fold line 24A in the bottom wall 22A. Each side wall 23A extends upwardly from bottom wall 22A and is fastened to an adjoining one to provide a continuous side wall foldably connected to bottom wall 22A.

Each side wall 23A has a generally rectangular portion 25A in the center portion thereof and a generally triangular portion 26A at one of its ends and a triangular portion 30A at its opposite end. The triangular portions 26A and 30A are arranged with one of their three points oriented adjoining the bottom wall 22A and one of their sides coextensive with an end of rectangular portion 25A.

In this exemplary embodiment of the invention is will be seen that triangular portion 26A together with associated portion 30A in an adjoining side wall provides a multiple thickness side wall at the point of juncture of adjoining side walls 23A. It should be noted that triangular portions 26A and 30A are preferably isosceles in shape and identical in size. The size of each such triangular portion normally controls the amount of outward flare of each side wall 23A.

A tab 28A is provided in triangular portion 26A in this exemplary embodiment of the invention for cooperation with a slit 29A in an adjoining side wall to thereby fasten each side wall 23A in position in a similar manner as described in the previous embodiment of this invention. Slit 29A is provided in the rectangular portion 25A at a point remote from the triangular portion 26A and adjacent the triangular portion 30A. Slit 29A is positioned at a location along the height of each side wall 23A corresponding to the position of tab 28A.

As will be apparent from FIGURES 7 and 8 of the drawings, a score line 46A defines the adjoining sides of rectangular portion 25A and triangular portion 30A. Similarly a score line 27A defines the adjoining sides of rectangular portion 25A and triangular portion 26A. Score lines 27A and 46A provide added flexibility enabling two adjoining walls 23A to be easily fastened together. Tab 28A is then inserted into a cooperating slit 29A of adjoining side wall 23A to securely fasten side walls 23A together about the periphery of hexagonal bottom wall 22A.

In the example illustrated in FIGURE 7 the triangular portion 30A is arranged inside of container 20A prior to locking tab 28A into slit 29A, while FIGURE 8 shows the positions of portions 26A and 30A after tab 28A has been locked in its cooperating slit 29A. The juncture provided upon inserting tab 28A into slit 29A is shown in section in FIGURE 9 and as illustrated in such figure a triangular double thickness of wall material is provided at that point providing the structural tie between adjoining side wall sections 23A.

While FIGURES 7 and 8 particularly illustrated the folding of triangular portion 26A and 30A with portion 30A located within container 20A it will be appreciated that triangular portions 30A could be positioned on the outside of the container 20A. This has been particularly illustrated in FIGURE 10 of the drawings. Thus if a user assemblies container 20A as shown in FIGURE 10, slit 29A will still be properly positioned relative to tab 28A with such tab projecting to the outside of container 20A. Furthermore, it is not necessary that the user of container 20A assemble it so that all of the tabs 28A project within or without the container. It is possible and would provide no difficulty if some of the tabs 28A are inserted so that they project into a given container 20A while others of such tabs are inserted through their cooperating slits 29A so that they project to the outside of such container. Also it will be appreciated that the position of slit 29A can be moved, within a limited range, to enable changing the angle of side wall 23A with respect to base 22A without other changes in the container structure.

Each side wall 23A has a peripheral projection or lip in each of its three portions 25A, 26A and 30A. Rectangular portion 25A has a fold line 31A which defines a lip 32A extending therebeyond, triangular portion 26A has a fold line 33A which defines lip portion 34A, and triangular portion 30A has a fold line 48A which defines a lip portion 49A. The lip portion 32A, 34A and 49A for each side wall 23A are folded generally horizontally in assembled container 20A about their respective fold lines.

The dish-like container 20A can be formed in any suitable manner while utilizing any suitable foldable material. It is preferably formed from the blank 40A illustrated in FIGURE 6 of the drawing. The blank 40A is made of cardboard or the like and may have one side or both sides thereof laminated with metallic foil or the like.

Blank 40A is suitably cut and scored to define a polygonal bottom wall 22A and a plurality, shown as 6 in this example, of side wall means or side walls 23A each foldably connected to an associated side of bottom wall 22A. In the assembled container 20A the side walls 23A extend generally upwardly an equal height.

A plurality of score lines 24A are provided in bottom wall 22A and each side wall 23A extends beyond a score line 24A associated therewith. Each side wall 23A has a centrally located rectangular portion 25A defined by a pair of spaced apart score lines 27A and 46A at opposite ends thereof and a triangular portion 26A at one end and a triangular portion 30A at its opposite end.

Triangular portion 30A has one of its sides coextensive with score line 46A while triangular portion 26A has one of its sides coextensive with score line 27A. The triangular portions 26A and 30A are arranged so that one of their three points is oriented adjoining bottom wall 22A.

Fold or score means 31A, 33A, and 48A are provided on each side wall means 23A defining extension means or lips 32A, 34A, and 49A respectively in the rectangular and triangular portions. The adjoining ends of lips 32A and 34A are separated and defined by a cut line 50A therebetween, while the adjoining ends of lips 32A and 49A are separated and defined by a cut line 51A. Similarly the terminal end of cut 42A is extended in a rectilinear mannner across blank 40A to define the adjoining ends of lips 26A and 30A. Cut lines 50A, 51A, and 42A make it possible to fold lip portions 32A, 34A, and 49A as required.

Cut means in each side wall means 23A defining tab 28A comprises an elongated contour cut shown at 42A. The wall material on one side of the cut defines projecting tab 28A for triangular portion 26A while a corresponding cutout 52A is defined in triangular portion 30A of an adjoining side wall 23A, see FIGURE 7. Tab 28A extends from triangular portion 26A at a location generally midway along the height of each side wall means 23A.

Similarly, at the opposite end of side wall means 23A, slit 29A is provided in the rectangular portion at a location along the height thereof corresponding to the location of the tab means 28A. It will be seen that up assembling container 20A from blank 40A each tab 28A cooperates with an associated slit 29A in an adjoining side wall 23A to provide means for individually fastening and unfastening each side wall means. As previously explained in connection with the previous embodiment of the invention each side wall means 23A may be folded individually so that it is coplanar with the bottom wall 22A for quick and ready access to the contents of the container.

Blank 40A has a score line 53A extending completely across bottom wall 22A. A score line 38A is also provided in each tab 28A which is in line with score line 53A and which coincides with the end portions of contour cut 42A. Blank 40A is folded about score lines 53A and 38A to reduce its area by one-half thus enabling such blank to be inserted into a much smaller container.

Thus it is seen that an improved dish-like container of simple and inexpensive construction is provided which may be folded into a compact area and in which the side wall means thereof are foldably connected to the bottom wall thereof for easy and quick assembly and disassembly. Furthermore, such a dish-like container is provided which may be used as a baking pan, for example, and then after the baking operation has been completed may be used as a serving dish in which the side walls may be readily disassembled and folder coplanar with the bottom wall for easy removal of the contents and then quickly and simply reassembled, if desired.

Further, this invention provides improved container blanks for making such a dish-like container or the like.

While the form of the invention now preferred has been disclosed as required by the statutes, other forms may be used, all coming within the scope of the claims which follow.

What is claimed is:

1. A dish-like container comprising, a bottom wall, a plurality of side wall means each foldably connected to said bottom wall and extending upwardly therefrom, each of said side wall means having a substantially triangular end portion arranged with one of its three points adjoining said bottom wall to thus provide an outwardly flaring side wall means while defining an angle with said bottom wall of not less than ninety degrees, tab means extending from one end of each of said side wall means, and slit means in each of said side wall means in the end opposite said tab means, each of said tab means cooperating with an associated slit means in an adjoining side wall means to individually fasten and unfasten each of said side wall means and thereby readily erect said container while providing means for access to said container through unfastening of said side wall means.

2. A dish-like container comprising, a hexagonal bottom wall, a plurality of side wall means each foldably connected to said bottom wall and extending upwardly therefrom to define an angle with said bottom wall of not less than ninety degrees, tab means extending from one end of each of said side wall means, slit means in each of said side wall means in the end opposite said tab means, each of said tab means cooperating with an associated slit means in an adjoining side wall means to individually fasten and unfasten each of said side wall means and thereby readily erect said container while providing means for access to said container through unfastening of said side wall means, extension means in each of said side wall means providing a lip extending generally transverse said side wall means, and score means extending generally through the center of said hexagonal bottom wall and bisecting each corner in said hexagonal bottom wall to thereby define six wedge-shaped areas in said bottom wall.

3. A dish-like container comprising, a bottom wall, a plurality of side wall means each foldably connected to said bottom wall and extending upwardly therefrom, each of said side wall means having a generally rectangular portion at one end and a generally triangular portion at its opposite end, said triangular portion arranged with one of its three points oriented adjoining said bottom wall to thus provide an outwardly flaring side wall means, tab means extending from one of said portions, and slit means in the other of said portions, each of said tab means cooperating with an associated slit means in an adjoining side wall means to individually fasten and unfasten each of said side wall means and thereby readily erect said container while providing means for access to said container through individually unfastening of said side wall means.

4. A container as set forth in claim 3 in which said tab means extends from one side of said triangular portion generally along the middle portion of said one side and said slit means is arranged in the remote end of said rectangular portion.

5. A container as set forth in claim 3 in which each of said side wall means is identical and further comprises extension means in the terminal end thereof providing a lip extending generally transverse said side wall means.

6. A dish-like container comprising, a bottom wall, a plurality of side wall means each foldably connected to said bottom wall and extending upwardly therefrom to define an angle with said bottom wall of not less than ninety degrees, each of said side wall means having generally rectangular area means and generally triangular area means, tab means extending from a triangular area means, and slit means in each of said rectangular area means, each of said tab means cooperating with an associated slit means in an adjoining side wall means to individually fasten each of said side wall means and thereby readily erect said container while providing means for access to selected portions of said container through individually unfastening of any number of said side wall means.

7. A container as set forth in claim 6 further comprising extension means in each of said side wall means providing a lip extending generally transverse said side wall means.

8. A container as set forth in claim 7 in which said generally triangular area means comprises a pair of generally triangular areas one extending from either end of said rectangular area means with one of the three points of each triangular area oriented adjoining said bottom wall and in which said tab means extends from one of said triangular areas, whereby upon inserting said tab means into a cooperating slit means at an adjoining side wall means the triangular portion from a side wall means is arranged overlapping the triangular portion of said adjoining side wall means to provide a double thickness structural wall adjacent said slit means.

9. A container as set forth in claim 8 in which said pair of triangular areas are generally isosceles in shape.

10. A dish-like container comprising, a bottom wall, a plurality of side wall means each foldably connected to said bottom wall and extending upwardly therefrom an equal height, each of said side wall means having a generally rectangular portion at one end and a generally triangular portion at its opposite end, said triangular portion arranged with one of its three points oriented adjoining said bottom wall to thus provide outwardly flaring side wall means, extension means in each of said rectangular and triangular portions providing a lip extending transverse thereto, tab means extending from each of said triangular portions generally midway along the height of said side wall means, and slit means in the end of said rectangular portion remote from said triangular portion and at a location along the height thereof corresponding to the position of said tab means, each of said tab means cooperating with an associated slit means in an adjoining side wall means to individually fasten and unfasten each of said side wall means, whereby said side wall means may be folded coplanar with said bottom wall individually and simultaneously for ready access to the contents of said container.

11. A container as set forth in claim 10 having metal foil laminated to a surface thereof.

12. A container as set forth in claim 10 in which said bottom wall has a polygonal shape and each of said side wall means is foldably connected to a corresponding side thereof and said rectangular portion has a side thereof equal in dimension to an associated side in said polygonal wall and the area of said triangular portion determines the angle of outward flare of said side wall means.

13. A dish-like container made from a single sheet of foldable material comprising, a bottom wall having a polygonal outline, a plurality of side wall means each foldably connected to a corresponding side of said polygonal bottom wall, each of said side wall means extending upwardly from said bottom wall an equal height and having a generally rectangular portion at one end and a generally triangular portion at its opposite end, said triangular portion being arranged with one of its three points oriented adjoining said bottom wall to thus provide an outwardly flaring side wall means, tab means extending from each of said triangular portions from a point generally midway along the height of said side wall means, and slit means in the end of said rectangular portion remote from said triangular portion and at a location along the height thereof corresponding to the location of said tab means, each of said tab means cooperating with an associated slit means in an adjoining side wall means to individually fasten and unfasten each of said side wall means, whereby said side wall means may be individually folded coplanar with said bottom wall for ready access to the contents of said container.

14. A blank for forming a dish-like container said blank being cut and scored to defined, a bottom wall, a plurality of side wall means each foldably connected to said bottom wall and extending upwardly and outwardly therefrom in the assembled container, cut means in each of said side wall means defining tab means extending from one end thereof, slit means in each of said side wall means in the end opposite said tab means, each of said tab means cooperating with an associated slit means in an adjoining side wall means to individually fasten and unfasten each of said side wall means and thereby readily erect said container from said blank while providing means for access to said container through unfastening of said side wall means, and score means in each of said side wall means defining extension means providing a lip extending generally transverse to said side wall means in the assembled container.

15. A blank for forming a dish-like container said blank being suitably cut and scored to define, a polygonal bottom wall, a plurality of side wall means each foldably connected to an associated side of said polygonal bottom wall and extending upwardly therefrom an equal height in the assembled container, score means in each of said side wall means defining a generally rectangular portion at one end thereof and a generally triangular portion at its opposite end, said triangular portion arranged with one of its three points oriented adjoining said bottom wall to thus provide a side wall segment defining an outward flare in each side wall means of the assembled container, score means in each of said side wall means defining extension means in each of said rectangular and triangular portions providing a lip which extends transverse to said side wall means in the assembled container, cutout means in said side wall means defining tab means extending from each of said triangular portions generally midway along the height of each of said side wall means, and elongated slit means in the end of said rectangular portion remote from said triangular portion and provided in a location along the height thereof corresponding to the location of said tab means, each of said tab means cooperating with an associated slit means in an adjoining side wall means of the assembled container to individually fasten and unfasten each of said side wall means, whereby said side wall means may be folded coplanar with said bottom wall of the assembled container for ready access to the contents of said container.

16. A blank as set forth in claim 15 in which said polygonal bottom wall is hexagonal in shape and includes score lines defining six equal areas in said bottom wall and a fold line traversing the entire blank at the midpoint thereof permitting such blank to be folded in two equal halves.

References Cited
UNITED STATES PATENTS 2,298,146   10/1942   Mersbach _____ 229—22
2,407,118   9/1946    Waters _____ 229—31

JOSEPH R. LECLAIR, *Primary Examiner.*

R. PESHOCK, *Assistant Examiner.*